US008280021B2

(12) United States Patent
Sanchez

(10) Patent No.: US 8,280,021 B2
(45) Date of Patent: *Oct. 2, 2012

(54) METHOD FOR MANAGING INFORMATION IN A TELEPHONE AND TELEPHONE FOR MANAGING INFORMATION

(75) Inventor: Andres Sanchez, El Dorado (PA)

(73) Assignee: Naxos Finance S.A., Luxembourg (LU)

( * ) Notice: Subject to any disclaimer, the term of this patent is extended or adjusted under 35 U.S.C. 154(b) by 859 days.

This patent is subject to a terminal disclaimer.

(21) Appl. No.: 12/187,935

(22) Filed: Aug. 7, 2008

(65) Prior Publication Data
US 2009/0041218 A1    Feb. 12, 2009

Related U.S. Application Data

(63) Continuation of application No. 09/407,174, filed on Sep. 28, 1999, now Pat. No. 7,746,994.

(51) Int. Cl.
*H04M 3/42* (2006.01)
*H04W 4/00* (2009.01)
(52) U.S. Cl. .................. 379/201.01; 455/463
(58) Field of Classification Search ........... 379/201.01, 379/199, 200, 196, 356.01, 354, 355.01; 455/463, 554, 555, 518, 519
See application file for complete search history.

(56) References Cited

U.S. PATENT DOCUMENTS

| 5,251,250 | A | * | 10/1993 | Obata et al. ............... 455/412.2 |
| 5,467,383 | A | * | 11/1995 | Urasaka et al. ............. 455/462 |
| 5,467,388 | A | | 11/1995 | Redd, Jr. et al. |
| 5,483,586 | A | | 1/1996 | Sussman |
| 5,541,988 | A | * | 7/1996 | Draganoff ................. 379/354 |
| 5,644,711 | A | * | 7/1997 | Murphy .................... 726/2 |
| 5,696,815 | A | | 12/1997 | Smyk |
| 5,842,124 | A | | 11/1998 | Keneagy et al. |
| 5,872,834 | A | | 2/1999 | Teitelbaum |
| 5,884,200 | A | | 3/1999 | Yamane et al. |
| 5,903,632 | A | * | 5/1999 | Brandon ................. 379/93.23 |
| 5,912,882 | A | | 6/1999 | Yafuso et al. |
| 6,005,927 | A | * | 12/1999 | Rahrer et al. ........... 379/142.01 |

(Continued)

FOREIGN PATENT DOCUMENTS
EP    0 462 488    12/1991
(Continued)

OTHER PUBLICATIONS

European Office Action conducted in counterpart European Application No. 98 810 968.2 on Aug. 19, 2011.

*Primary Examiner* — William Deane, Jr.
(74) *Attorney, Agent, or Firm* — Greenblum & Bernstein, P.L.C.

(57) ABSTRACT

Method for managing lists stored in a mobile telephone includes automatically storing telephone numbers of incoming and outgoing calls in a first or second list. The first list is accessible to any use, the second list contains code protected telephone numbers. A telephone number stored in a temporary register is verified to whether it's contained within the second list. Method includes limiting a user's access to only telephone numbers in first list until a code is input by user. After inputting code, telephone numbers in first and second lists are accessible by user. Both first and second lists are stored in mobile phone, and telephone numbers associated with second list are not stored in first list, and second list is at least one of accessible and displayable only after inputting code.

6 Claims, 5 Drawing Sheets

U.S. PATENT DOCUMENTS

| | | | |
|---|---|---|---|
| 6,038,551 | A | 3/2000 | Barlow et al. |
| 6,052,604 | A * | 4/2000 | Bishop et al. ................. 455/558 |
| 6,091,808 | A * | 7/2000 | Wood et al. ............. 379/201.04 |
| 6,195,568 | B1 | 2/2001 | Irvin |
| 6,208,713 | B1 * | 3/2001 | Rahrer et al. ................ 379/67.1 |
| 6,208,869 | B1 | 3/2001 | Roberts et al. |
| 6,249,579 | B1 * | 6/2001 | Bushnell ................. 379/356.01 |
| 6,259,908 | B1 | 7/2001 | Austin |
| 6,324,541 | B1 | 11/2001 | De L'Etraz et al. |
| 6,330,442 | B1 | 12/2001 | Seppanen |
| 6,339,710 | B1 * | 1/2002 | Suzuki .......................... 455/458 |
| 6,456,706 | B1 * | 9/2002 | Blood et al. .................. 379/188 |
| 6,618,586 | B2 * | 9/2003 | Inoue .......................... 455/343.2 |
| 6,868,150 | B1 * | 3/2005 | Reese ...................... 379/215.01 |
| 7,218,728 | B1 * | 5/2007 | Nagasawa et al. ....... 379/387.01 |
| 2001/0053690 | A1 * | 12/2001 | Inoue ........................... 455/415 |

FOREIGN PATENT DOCUMENTS

| | | |
|---|---|---|
| EP | 0 510 412 | 10/1992 |
| EP | 0 663 752 | 7/1995 |

\* cited by examiner

METHOD FOR MANAGING INFORMATION IN A TELEPHONE AND TELEPHONE FOR MANAGING INFORMATION

CROSS-REFERENCE TO RELATED APPLICATIONS

The present application is Continuation of U.S. patent application Ser. No. 09/407,174 filed Sep. 28, 1999 now U.S. Pat. No. 7,746,994, and is a counterpart of European Patent Application No. 98 810 968.2, filed on Sep. 25, 1998, the disclosure of these documents are expressly incorporated by reference herein in their entireties.

BACKGROUND OF THE INVENTION

1. Field of the Invention

The present invention is directed to an electronic telephone apparatus and a method for managing pieces of information (data) relating to telephone number lists stored in the telephone, in which the display and use of the data is allowed only after an access code is inputted into the telephone.

2. Background and Material Information

Telephones exist that automatically store (memorize) information and data relating to telephone numbers that have been made and/or received. This information is typically maintained in suitable lists prepared by the user of the telephone, or automatically by the telephone itself.

As a result, a record of each call that has been made or received, together with the corresponding date, duration, number and name of the calling or called persons, may be maintained. Certain telephones also permit the verbal or textual storing of special data, such as, for example, notes about the conversation.

Such electronic telephones may include a security access feature that prevents an unauthorized individual from making outgoing calls, or utilizing other features of the telephone. Accordingly, unauthorized individuals may be limited to, for example, receiving incoming calls and/or making emergency calls (e.g., calls to 911).

Telephone devices, such as, for example, mobile type telephones, are designed by the manufacturer on the assumption that the telephone will be primarily used by a single user. Such telephones require only that a single access code be input to gain access to all of the capabilities of the telephone, with the possible exception of reprogramming of function parameters of the telephone, which generally requires the input of a special access code.

However, a problem occurs when such a telephone includes only a single access code but is used by multiple individuals (such as, for example, employees of a company that owns the telephone). In this situation, private data of one individual would be available to all the other individuals of the telephone. The stored data may be confidential, and the undesired exposure of the stored confidential data (or the calls received by the user(s) of the telephone) may violate the privacy of the user(s).

Once the access code has been inputted to activate such prior art telephones, any person using the telephone can review all the data stored in the telephone, regardless of whether the data was stored by that individual or by another individual. Similarly, the user of the telephone can retrieve all the data stored in the telephone (including data pertaining to all incoming and/or outgoing calls), such as, for example, telephone numbers, length of the telephone conversation, data and time of the telephone conversations, memo data stored during the telephone conversation, etc., regardless of who stored the data.

It is noted that it is possible, with a telephone that includes an automatic memorization function, to provide for the automatic erasure of the list corresponding to, for example, outgoing calls, incoming calls and/or the corresponding notes. However, such an operation can be very annoying, and, in any event, negates the advantage of providing the automatic memorization feature in the first place.

SUMMARY OF THE INVENTION

Accordingly, the present invention provides a method and apparatus for managing pieces of information and data relating to telephone number lists stored in an electronic telephone.

According to a feature of the invention, the display and use of the stored data is allowed only after a personal secret access code, that is associated with a particular (specific) user of a plurality of users of the telephone, is entered by the user. Only the data associated with the specific user of the telephone (as identified by the inputted secret access code) will be made available to that individual. Accordingly, the present invention permits multiple individuals to use a common telephone, while providing for the maximum privacy of each user's personal data.

According to the invention, a method is disclosed for managing telephone data used with a telephone. Telephone data related to at least one of incoming and outgoing telephone calls is stored in a list, with the telephone data being designated as one of public data and private data. Access to the list is limited to a list of public telephone data, until such time as a user of the telephone inputs a personal secret access code. After the user enters the personal secret access code, the user has access to the list of public telephone data and a list of private telephone data that is associated with the inputted personal secret access code.

According to a feature of the invention, the list is shown on a display associated with the telephone.

Another feature of the invention is that telephone data is stored in a public list, and private telephone data is stored in a private list. Alternatively, public telephone data and private telephone data may be stored in a common list. Further, the private telephone data can be hidden from the user until the user inputs the personal secret access code.

According to an advantage of the invention, a personal secret access code is inputted by manipulating a predetermined key sequence on a keypad of the telephone to initiate an operation to enter the personal secret access code.

The method of the present invention provides two telephone operating modes; a first mode that has no access restrictions, and a second mode with access restrictions. An incoming call may be rejected and an indication of the incoming call may be blocked when a telephone number is designated as a protected telephone number. The telephone can be switched between the two operating modes by manipulating a predetermined keypad command on a keypad of the telephone. For example, a particular sequence of commands on the keypad or a plurality of contemporary commands performed on the keypad can be manipulated to switch between the two operating modes.

According to another feature of the invention, the switching between the two operating modes can be delayed until the user inputs the personal secret access code.

According to another object of the invention, a telephone is disclosed that manages integrally stored telephone data. The telephone has a memory that stores telephone data related to at least one of incoming and outgoing telephone calls. The telephone also includes a personal secret access code entry device that enables a user of the telephone to enter a personal secret access code. Access to the stored telephone data is initially limited to a public list that contains public telephone data. However, when the user enters his personal secret access code, the user has access to both the public telephone data contained in the public list and a private list that contains private telephone data that is associated with the inputted personal secret access code.

The telephone also includes a display that provides a visual indication of the public telephone data contained in the public list and/or the private telephone data contained in the private list.

According to a feature of the invention, the telephone includes an inhibitor. The inhibitor prevents a visual indication and/or an audible indication of an incoming call from being given to a user of the telephone when a telephone number of the incoming call is designated to be a private call corresponding to a personal secret access code that has not been inputted into the telephone by a current user of the telephone.

According to a feature of the invention, the personal secret access code is inputted by manipulating a predetermined key sequence on a keypad of the telephone. Alternatively, the personal secret access code may be inputted by manipulating a predetermined sequence of simultaneous commands on the keypad for a predetermined time period.

Another aspect of the invention concerns a method for managing data used with a telephone. A personal secret access code is entered into the telephone by a user of the telephone. A private list, containing telephone numbers associated with the personal secret access code entered by the user, is created. The telephone numbers contained in the private list may be accessed only by the user that entered the associated personal secret access code. The telephone also has a public list that was created containing telephone numbers that may be accessed by any user of the telephone, without the need for entering a personal secret access code.

The telephone may be switched between a public operating mode and a private operating mode by manipulating a predetermined command on a keypad of the telephone. The personal secret access code may be entered by manipulating a predetermined key on a keypad of the telephone for a predetermined period of time to initiate an operation to enter the personal secret access code, or by manipulating a predetermined sequence of simultaneous commands on the keypad for a predetermined period of time to initiate an operation to enter the personal secret access code.

According to a feature of the invention, notification of an incoming call can be prevented when the telephone number of the incoming call is designated as a private telephone number and the user that designated the incoming call as a private telephone number is not a current user of the telephone.

An advantage of the invention resides in the telephone being usable by a plurality of users, in which each user has their own unique, personal secret access code. The telephone numbers in the private list are associated with various personal secret access codes. A current personal secret access code entered into the telephone by a current user is limited to accessing telephone numbers in the private list that are associated with the current personal secret access code entered by the current user.

An advantage of the invention resides in the ability to prevent the current user from being notified of an incoming call when the incoming call is designated as a private telephone number associated with a personal secret access code of a different user of the telephone.

The invention is directed to a method for managing information and data relating to telephone numbers organized in lists stored in a mobile telephone. The method includes automatically storing telephone numbers of incoming and outgoing telephone calls in one of a first or a second list. The first list is accessible to any user during operation of the mobile telephone and the second list contains personal access code protected telephone numbers. The automatic storing includes storing in a temporary register a current one of the telephone number of the outgoing call selected by the user or the telephone number of the incoming call, and verifying whether the telephone number in the temporary register corresponds to a code-protected telephone number. When the telephone number stored in the temporary register corresponds to a code-protected telephone number, the telephone number is stored in the second list, and when the telephone number stored in the temporary register does not correspond to a code-protected telephone number, the telephone number is stored in the first list. The method also includes limiting a user's access to only the telephone numbers in the first list until a personal access code associated with the second list is input by the user. After inputting the personal access code, telephone numbers in the first and second lists are accessible by the user. Both the first and second lists are stored in the mobile phone, and telephone numbers associated with the second list are not stored in the first list, and the second list is at least one of accessible and displayable only after inputting the personal access code.

According to a feature of the invention, the method can also include displaying on a display associated with the mobile telephone numbers from at least one of the first and second lists. Further, until the personal access code associated with the second list is input by the user, calls to the mobile telephone from telephones having telephone numbers stored in the second list are not displayed.

In accordance with another feature of the present invention, until the personal access code associated with the second list is input by the user, calls to the mobile telephone from telephones having telephone numbers stored in the second list are one of rejected or blocked without the user's knowledge.

The invention is directed to a mobile telephone that manages stored telephone data. The mobile telephone includes a memory that stores telephone data related to at least one of incoming telephone calls to and outgoing telephone calls from the mobile telephone, a personal access code entry device that enables a user of the mobile telephone to enter a personal access code, a first list containing public telephone data stored in the memory before the personal access code is entered, wherein the public telephone data in the first list is accessible by all users during operation of the mobile telephone, a second list containing private telephone data stored in the memory after the personal access code is entered, wherein the private telephone data in the second list is accessible by the user only after entry of the personal access code, and a device for at least one of blocking and rejecting an incoming telephone call when the telephone number for the incoming call is stored in the second list and the personal access code has not been entered.

In accordance with a feature of the instant invention, the at least one of blocking and rejecting an incoming telephone call comprises a device structured and arranged to prevent at least one of a visual or audible indication of an incoming call from a telephone number listed in the second list unless the personal secret access code has been previously entered.

The invention is directed to a method for managing data used with a mobile telephone. The method includes entering a personal access code into the mobile telephone by a user of the mobile telephone, one of creating and updating a first list containing telephone data comprising incoming telephone numbers received and outgoing telephone numbers called before entering the personal access code, and one of creating and updating a second list containing telephone data comprising incoming telephone numbers received and outgoing telephone numbers called after entering the personal access code. Telephone numbers in the second list are not listed in the first list.

According to a feature of the invention, the method can include preventing the user from being notified of an incoming call from a telephone number listed in the second list, unless the personal code has already been entered.

In accordance with another feature of the instant invention, the method can include switching between a first operating mode for public use and a second operating mode for personal access code protected use by manipulating a predetermined command on a keyboard of the telephone.

According to still another feature, the method may include storing in a temporary register a current one of the telephone number entered by the user for sending as an outgoing call or the telephone number of an incoming call to the mobile telephone, and verifying whether the telephone number in the temporary register is contained within the second list. When the telephone number stored in the temporary register is within the second list, the telephone number is stored in the second list, and when the telephone number stored in the temporary register is not within the second list, the telephone number is stored in the first list.

In accordance with still yet another feature of the present invention, the method can include storing in a temporary register a current one of the telephone number entered by the user for sending as an outgoing call or the telephone number of an incoming call to the mobile telephone, and verifying whether the personal access code has been entered. When the personal access code has been entered, storing the telephone number stored in the temporary register in the second list, and when the personal access code has not been entered, storing the telephone number stored in the temporary register in the first list.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
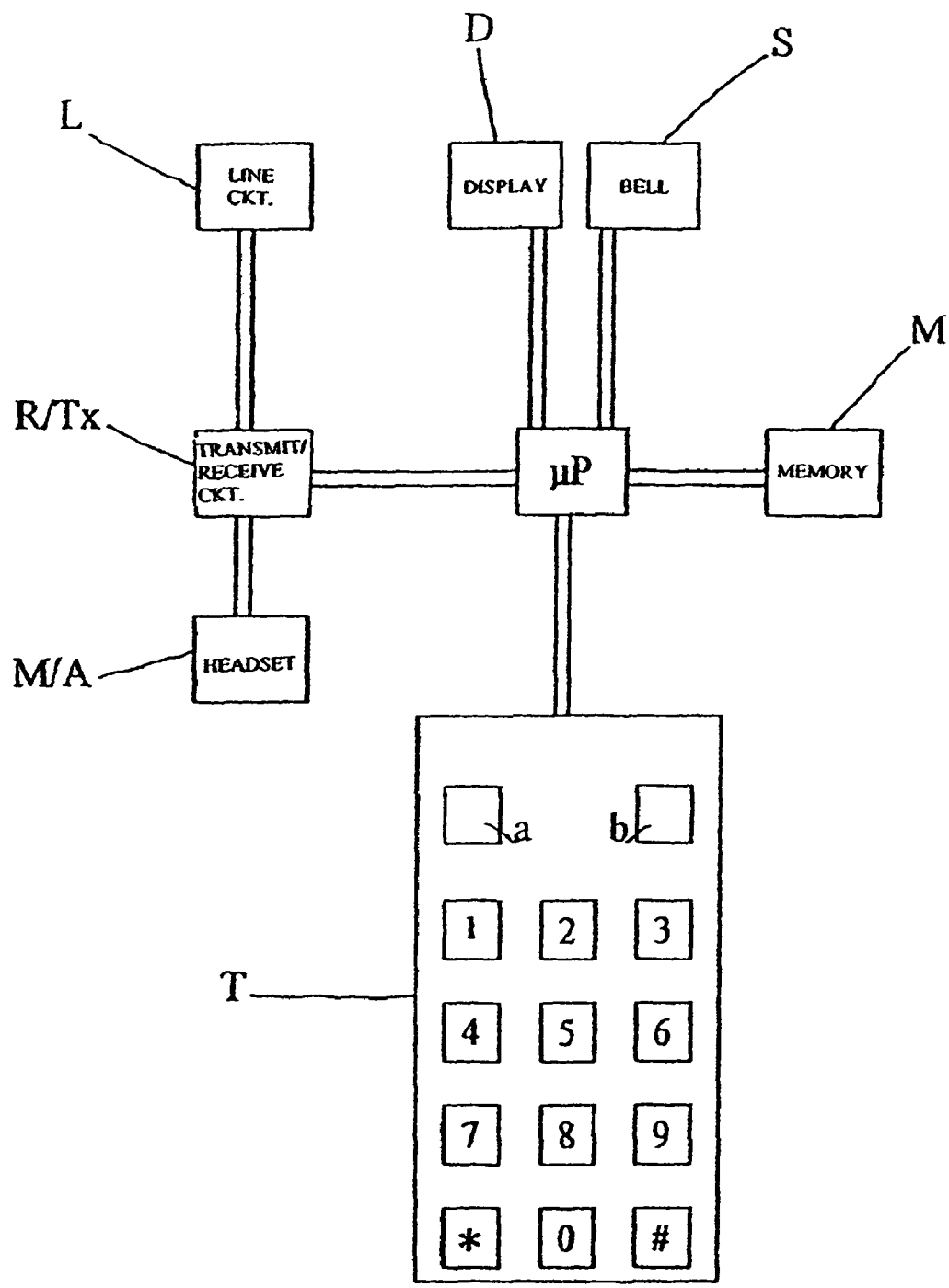
FIG. 1 illustrates a block diagram of an electronic telephone according to the present invention.

FIG. 1 is a block diagram of an electronic telephone according to the present invention. Telephone device TD is connected to a line circuit L, which may be either a hard wired connection (when the telephone is used, for example, a PBX system) or a wireless connection (when the telephone is, for example, a mobile phone). The line circuit L is connected to a transmit/receive device R/Tx. The transmit/receive device is inter-connected to one side to a handset MIA (or handset equivalent, such as, for example, a microphone and separate earpiece), and, a processor µP.

The processor µP is interfaced to a bell S, a display D, a memory M, and a keypad (keyboard) T. It is noted that the memory comprises a read-write memory. In the instant invention, the memory M comprises a dynamic memory that stores user data and a program memory that stores operational features of the telephone.

However, it is understood that both functions can be performed by a single memory, or separate memories, without departing from the scope and/or spirit of the instant invention. Further, different types of memories may be utilized without departing from the scope and/or spirit of the invention.

The keypad T has a plurality of keys labeled from "0" to "9", an asterisk key "*", a pound key "#" key, and two special purpose function keys "a" and "b". Function keys "a" and "b" control various menus shown on the display D. Keyboards of such a type are commonly employed on mobile (cellular) phones.

Figure 2:
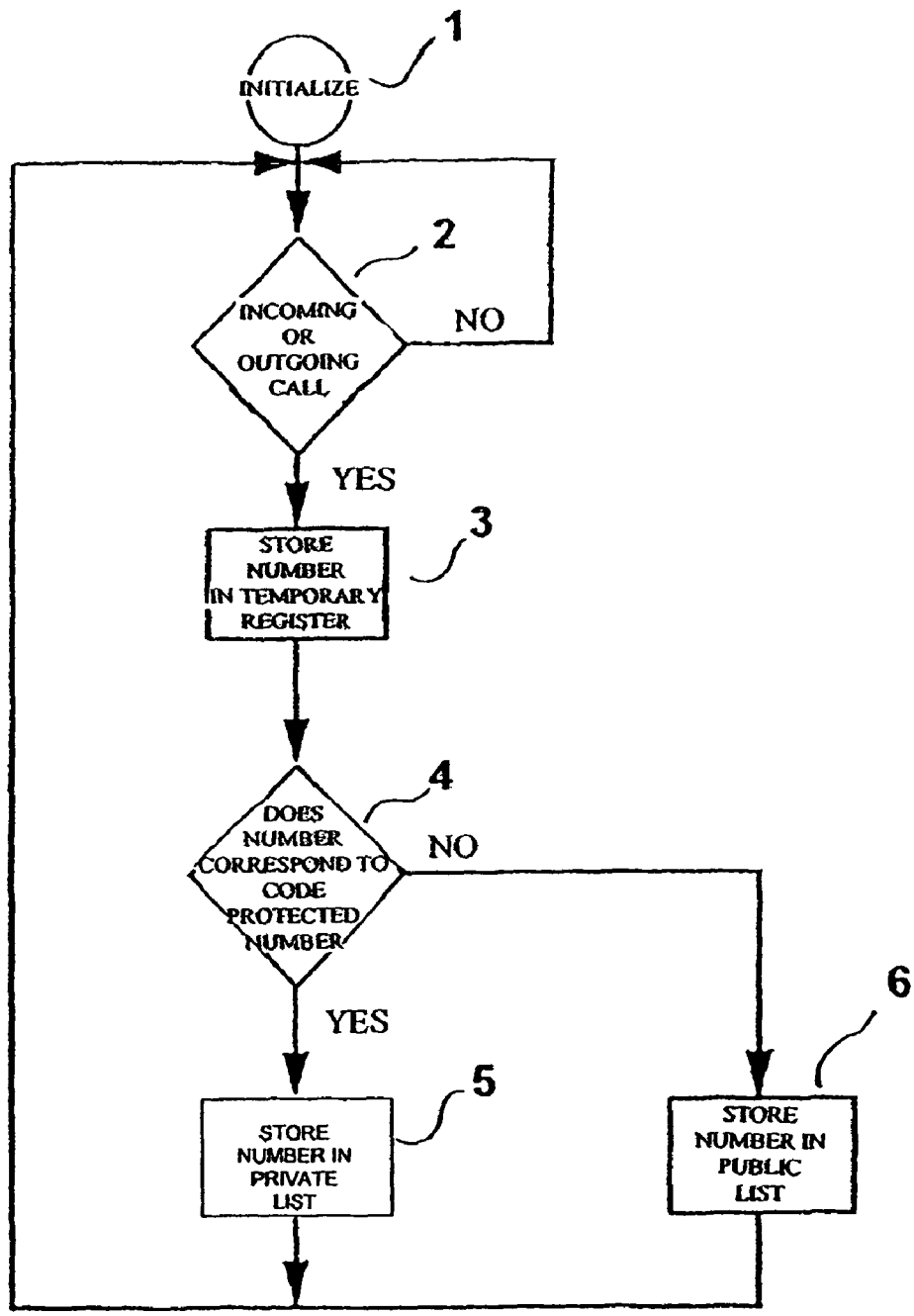
FIG. 2 is a flow-chart illustrating a procedure for automatically memorizing (storing) telephone numbers in the telephone of FIG. 1.

FIG. 2 illustrates the procedure for automatically storing data, such as, for example, a called or received telephone number, in the memory M. This routine is executed by the processor µP when the automatic storing feature is operational. The operation of the processor µP starts at step 1 each time the telephone is turned ON, wherein, for example, registers of the processor µP and the memory M are initialized. Thereafter, processing proceeds to step (test block) 2, wherein it is determined whether a number has been chosen by the user for making an outgoing call, or whether an incoming call is being received from a certain (pre-programmed) telephone number. When there is an outgoing or incoming telephone call, the result of this determination is positive, and control is passed to step 3. If the result of the determination is negative, control loops back to step 2, which is continuously repeated until such time as the determination is positive.

Step 3 is executed when a telephone call is received or made (e.g., the determination in step 2 is YES). The telephone number chosen by the user (or the number corresponding to the incoming call) is stored in a temporary register, after which, the number is examined to determine whether it corresponds to a code-protected number (steps 3 and 4). When the processor µP concludes that the number corresponds to a code-protected number (e.g., a confidential number associated with a user), processing proceeds to step 5. On the other hand, when the determination is negative, processing proceeds to step 6.

As indicated above, when it is determined, in step 4, that the telephone number in the temporary register corresponds to a code-protected number, step 5 is executed, wherein the code-protected telephone number is stored in a private list associated with the secret access code entered by the user of the telephone. Accordingly, this data (e.g., the telephone number) will only be accessible by the user that inputs the secret access code. Thereafter, processing loops back to step 2 to await the next received or called telephone number.

When it is determined, in step 4, that the telephone number stored in the temporary register is not code-protected, step 6 is executed, so that the telephone number is stored in a public list of outgoing and/or incoming calls, so that any user of the telephone may access the number. Thereafter, processing loops back to step 2 to await the next received or called telephone number.

Figure 3:
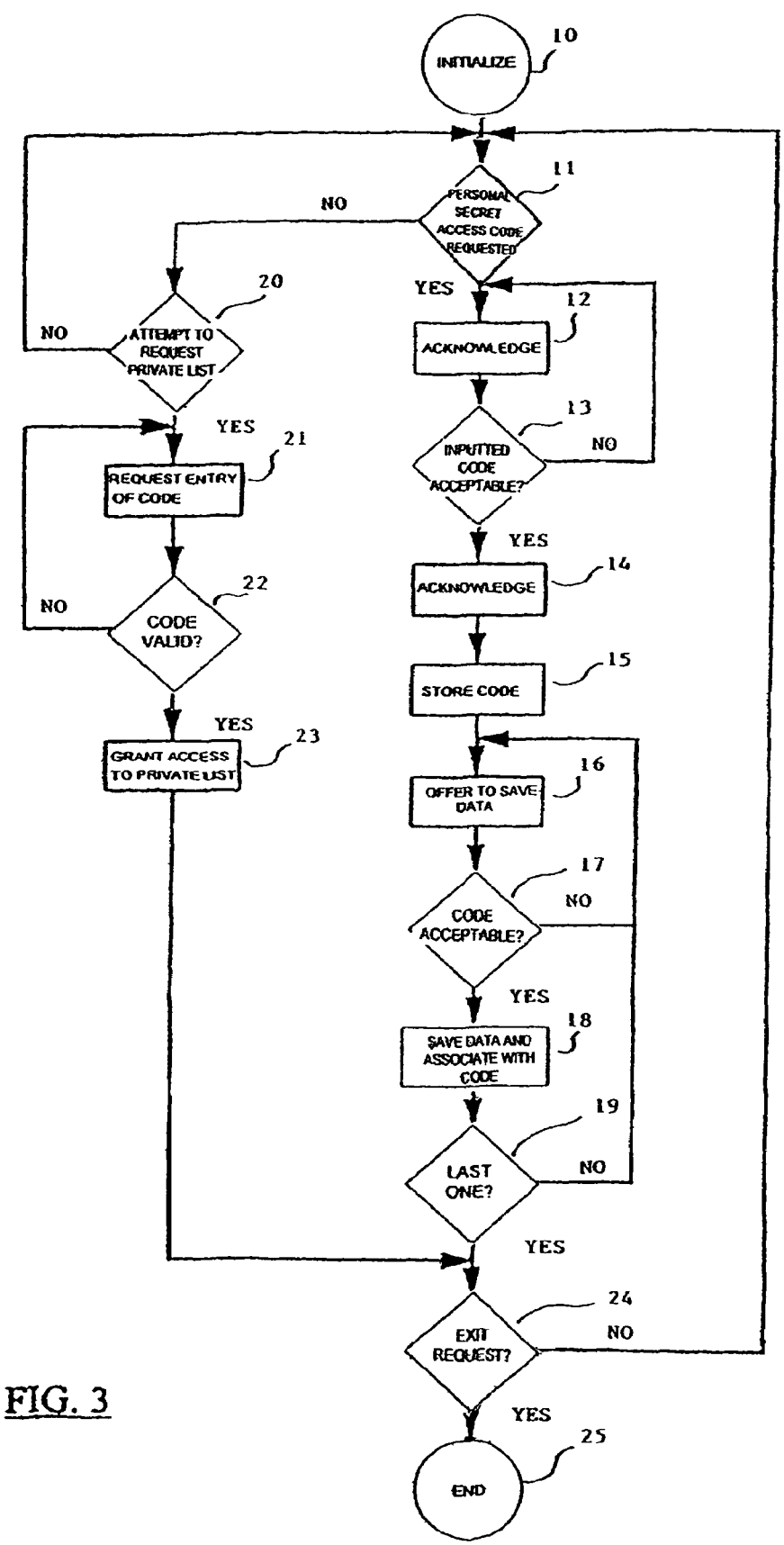
FIG. 3 is a flow-chart illustrating a procedure for requesting and inputting a personal secret access code in the telephone of FIG. 1.

FIG. 3 shows the operations performed by the telephone TD to determine whether an inputted personal secret access code is a valid access code. Until the processor μP determines that a valid personal secret access code has been entered, a user will be denied access to the data in the private lists stored in the telephone TD. Once a valid personal secret access code is entered, the user will have access to the data in the private list(s) associated with the particular secret personal access code.

In order to simplify the following explanation, instead of explaining what the central control unit performs during the various phases of the procedure, as indicated by steps 10 to 25 in FIG. 3, an explanation will be provided based upon the actions that would be taken by a user of the telephone TD.

The processor μP arrives at step 10 in a number of ways. For example, the processor may proceed to step 10 when a user of the telephone TD initiates a routine to request (or enter) a personal secret access code via manipulation of one and/or both of the special purpose function keys "a" and "b". It is understood that variations may take place without departing from the spirit and/or scope of the instant invention. In step 10, registers associated with this routine are initialized. Processing then proceeds to step 11.

At step 11, a determination is made as to whether a user has requested a personal secret access code. When this determination is positive, processing proceeds to step 12; otherwise, processing jumps to step 20.

At step 12, the request for a code is acknowledged, and the control is then passed to step 13. Step 13 determines whether the personal secret access code inputted by the user is acceptable (available), according to certain predefined rules (such as, for example, being a minimum number of numerals). When a valid personal secret access code is entered, the user is informed that the personal secret access code is valid, and a portion of the memory M is allocated for storing the access code and associated private data (e.g., telephone numbers) (steps 14 and 15).

On the other hand, if it is determined, in step 13, that the inputted personal secret access code is not valid, processing loops back to step 12, and the user is requested to enter a new personal secret access code.

After a portion of the memory M is allocated for storing the personal secret access code and associated private data, the user is afforded the opportunity to save (store) data, such as, for example, a telephone number, to be associated with the personal secret access code (step 16). A test is then performed (step 17) to confirm that the code inputted by the user is acceptable. An affirmative determination results in processing continuing to step 18, while a negative determination results in the processing returning to step 16.

At step 18, the private telephone number(s) entered by the user are stored into the private memory area corresponding to the secret access code. Control then passes to step 19, which determines whether the data (e.g., telephone number) inputted by the user is the last one. When the last number has been added (determination is YES), processing passes to step 24; otherwise, processing returns to step 16 to afford the user the opportunity to enter another telephone number.

At step 24 a determination is made as to whether an exit request has been made by the user (e.g., the user has indicated that he does not wish to store any additional telephone numbers). If the user indicates that he wishes to exit this routine, step 25 is executed to end the routine for entering the secret personal access code and associated private numbers. Control then passes to the general operating program of the telephone, so that other functions may be performed.

On the other hand, if step 24 determines that the user has not entered an exit request, processing loops back to step 11, and the above process is repeated.

As noted above, step 11 determines whether a user has requested a personal secret access code. When this determination is negative, processing proceeds to step 20. A determination is made as to whether the user has attempted to access a private list. When this result is positive, the user is requested to enter their personal secret access code, which is tested to verify that it is a valid access code. When a valid private access code has been entered, the user is granted access to the private list area (steps 20 to 23), after which, control passes to step 24.

It is noted that a modification can be made to limit the number of attempts a user has to input a code at step 21, without departing from the spirit and/or scope of the invention. For example, the routine of FIG. 3 can be modified, to increase security, by permitting, for example, a maximum of, for example, 3 code entry attempts at step 21, before the routine quits.

It is noted that many variations of the above description are possible. One file may be maintained for public access numbers and an additional file(s) may be maintained for restricted (private) lists. In this way an electronic telephone, such as, for example, a mobile (cellular) phone, can be programmed for two or more different operating modes; a first mode in which public numbers are usable by all users of the telephone, and a second, restricted (private) mode.

The public list permits free access by all users, while the private list is protected by a personal secret access code in order to protect the privacy of the users of the telephone. According to the present invention, private list data is only displayed after the valid personal secret access code is input to the telephone.

The present invention also provides that incoming and/or outgoing calls are kept secret from all other users of the telephone. In this regard, the telephone can also be instructed to refuse in-coming calls from protected (private) numbers, without providing an indication of the in-coming call (e.g., inhibiting the operation of the bell S) when the associated personal secret access code has not been entered.

Figure 4:
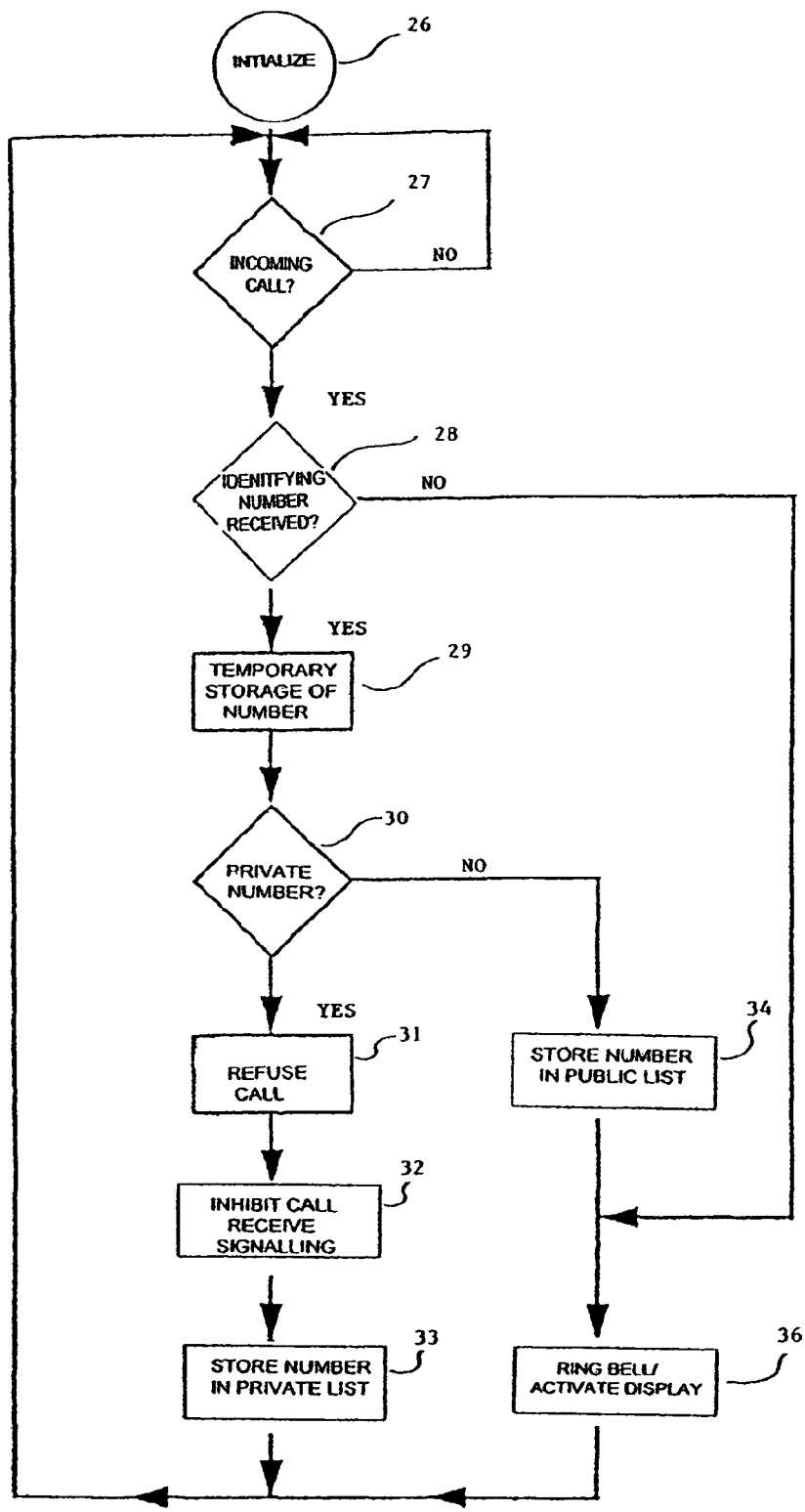
FIG. 4 is a flow-chart illustrating a public mode operation of the telephone of FIG. 1.

FIG. 4 shows the routine that is followed for receiving a public mode telephone call. The telephone TD is set to the public mode when a personal secret access code is not inputted to the telephone TD.

The processor μP of the telephone TD performs an initialization procedure (step 26) each time the telephone TD is turned ON. Step 27 is repeatedly executed until such time as it is determined that an incoming call has been received.

When a call is received, it is determined whether the telephone network (which, as not earlier, may be a fixed network or a wireless network) has sent the identifying number of the calling user (e.g., has a caller id signal been received). When the telephone TD receives a caller ID signal, the telephone is stored in a temporary register of the μP (steps 28 and 29). The telephone number stored in the temporary register is examined (in step 30) to determine whether the number of the calling person is a protected number.

If the telephone number is a protected number, the call is refused. That is, no indication of an incoming call is shown on the display D and the bell S is inhibited from ringing. The telephone number of the refused call is then stored in the private list associated with the personal secret access code, so that the individual associated with the personal secret access code can be informed that he had received a telephone call. Processing then returns to step 27 to await the next incoming call (steps 30 to 33).

If, at step 28, it is determined that the caller ID number has not been sent by the telephone network, processing jumps to step 36, in order to ring the bell S and provide an indication on the display D of the incoming call. Control then returns to step 27 to await the next incoming call.

If, at step 30, it is determined that the incoming telephone number is not a protected telephone number, processing proceeds to step 34, so that the telephone number of the incoming call is stored to the public list. The bell S is activated and an indication of the incoming call is shown on the display D (step 36), after which, processing returns to step 27 to await the next in-coming call.

It is understood that various modifications/variations may be implemented without departing from the spirit and/or scope of the instant invention. For example, the telephone TD can be modified to provide an on request disabling of the call, so that the user can elect whether or not to accept the call. In addition, the telephone TD can be modified to allow the user associated with the personal secret access code to disable the above-described call rejection feature.

Figure 5:
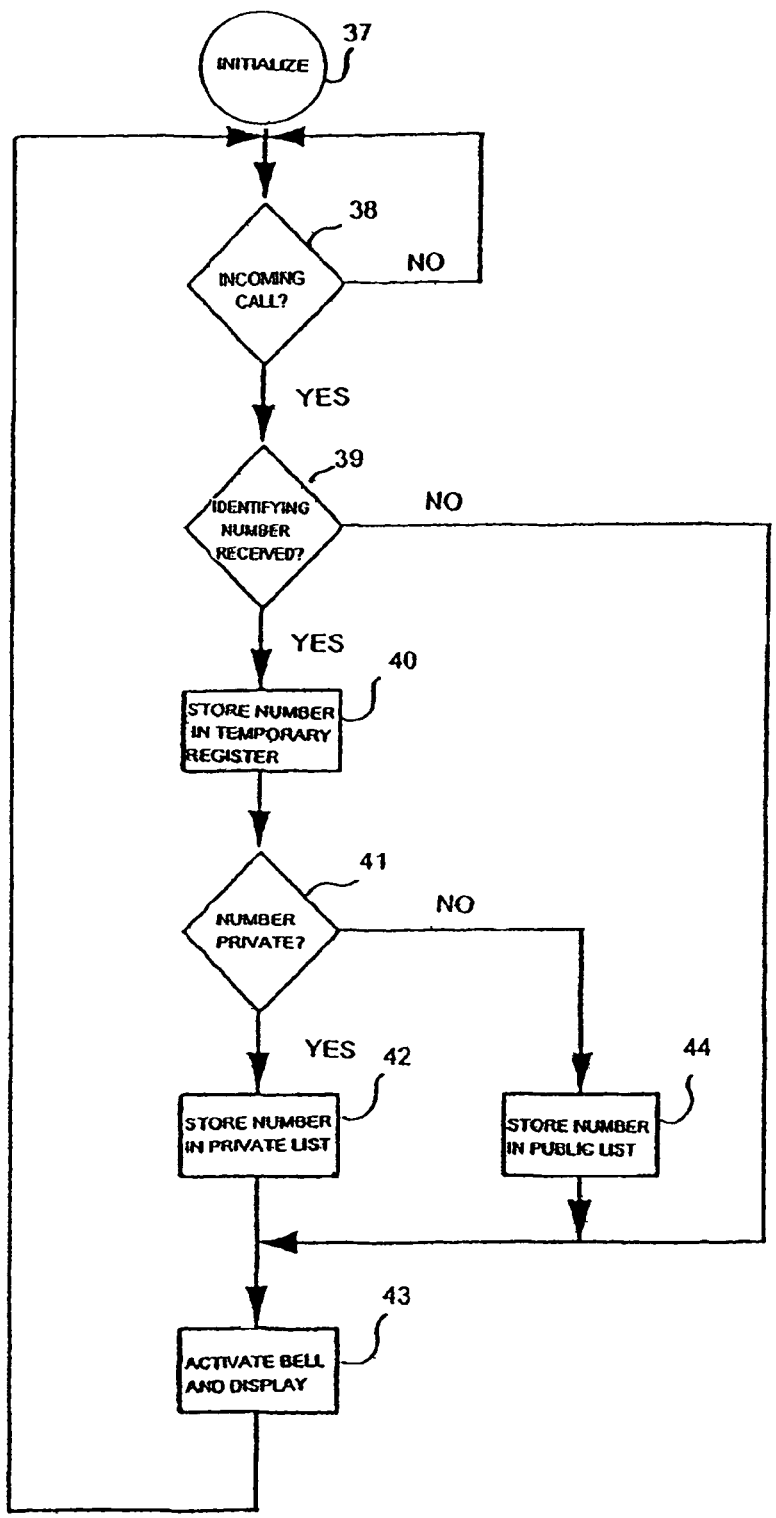
FIG. 5 is a flow-chart illustrating a private mode operation of the telephone of FIG. 1.

FIG. 5 shows the procedure that is performed with respect to a private mode call. The private mode operation of the telephone TD is activated when the user inputs their associated personal secret access code.

Initially, registers are initialized at step 37 when the telephone TD is first turned ON. Thereafter, step 38 is continuously repeated until it is determined that an incoming telephone call has been received. When an incoming call has been received, the telephone TD determines whether the telephone network has sent the identifying number of the calling person (e.g., whether caller ID information has been received). If the telephone TD has received caller ID information of the calling individual, the telephone number is stored in a temporary memory (e.g., register) of the processor µP, after which, a determination is made as to whether the temporarily stored number is a protected (e.g., private) number (steps 39 to 41). If it is determined that the telephone number of the incoming telephone call is a private call, the telephone number is stored in the private list associated with the previously entered personal secret access code, the bell S of the telephone TD is activated, and the display D of the telephone TD is actuated to indicate that an incoming call is being received (steps 42 and 43). Thereafter, processing returns to step 38 to await a next incoming telephone call.

On the other hand, if it is determined, at step 39, that the telephone network did not transmit the caller ID information to the telephone TD, processing jumps to step 43 to cause the bell S of the telephone TD to ring and the display D of the telephone TD to indicate that an incoming call is being received, without any indication of the incoming call telephone number being stored in the telephone TD. Thereafter, processing returns to step 38 to await a next incoming telephone call.

Similarly, if the caller ID information is received and an examination of the caller ID information discloses that the incoming call is a public call (e.g., the telephone number of the incoming call is not associated with any private list of the telephone TD), processing jumps from step 41 to step 44, so that the telephone number is stored to the public list prior to executing step 43 to ring the bell S and provides a visual incoming call indication on the display D.

According to the disclosed invention, the storage device M of the telephone TD, which contains the list of telephone numbers corresponding to incoming and/or outgoing calls, is divided into at least two areas. However, it is understood that a single list for both public and private data can be used without departing from the spirit and/or scope of the invention. The first area comprises a public area that may be accessed by all users of the telephone TD once the telephone TD is turned ON. The second (or additional) area(s) comprise one (or more) private area(s) that may be accessed and viewed only after the user inputs a previously defined personal secret access code.

The telephone numbers of all incoming and/or outgoing calls are stored in the public area (list), with the exception of any telephone number(s) that may have been defined by a user as being a private telephone number. Protected (private) numbers will be stored in the private list of the user associated with the registered personal secret access code.

In practice, a user of the telephone TD manipulates the menu features of the telephone TD to set operating parameters of the telephone TD. For example, the user defines his secret personal access code to access his private list area prior to placing and/or receiving telephone calls. The user then creates a list of protected numbers, which will be stored in a private memory area (and not the public area) that is associated with the previously defined personal secret access code. Once the telephone has been configured to the user, all non-protected numbers will be stored in the public list of the incoming and/or outgoing calls, while protected calls will be stored in the associated user's private list.

The protected numbers stored in the private list associated with the personal secret access code may only be accessed and viewed by the user that previously defined the personal secret access code.

Assume that a user previously defined his personal secret access code to be "12345". Also, assume that the telephone numbers "01-54-4992267" and "01-71-919276" have previously been designated by the user to be private (protected) telephone numbers. Further, assume that the same user made (or received) telephone calls to/from the following telephone numbers: "01-71-2531927"; "01-54-4992267"; "2-01-2191441"; 00-17-07-4453475"; "01-71-9193276"; and "01-71-9193279".

Based upon the above, only the non-protected telephone numbers will appear in the public list. Meanwhile, two protected (private) numbers will be stored in the private list, which, as noted above, may be accessed and viewed only after the user has inputted the associated personal secret access code number "12345". Thus, the public list and the private list will contain the following data:

| Public List | Private List |
| --- | --- |
| 01-71-2531927 | 01-54-4992267 |
| 2-01-2191441 | 01-71-9193276 |
| 00-17-07-4453475 | 01-71-9193279 |

In order to maximize the benefits of the present invention, the telephone TD can be designed such that, when it is operating in the public list mode, the existence of the private mode feature is hidden until such time as the user enters a personal secret access code.

Initially, assume that the telephone TD is set to the public list mode.

As noted above, it is preferable that no indication be included in the menus of the telephone TD which allows an individual to request a secret code to access a private mode, because if the existence of the private list mode is known, a fortuitous user might ask the proprietor of the telephone TD about the existence of the secret access code.

An access command can be inputted by the user at any time, without any explicit indication on the part of the telephone TD. For instance, the telephone TD can be designed such that a personal secret access code can be inputted by the user only after the manipulation of a predetermined key on the keypad T within a predetermined period of time, such as, for example, pressing a certain key (e.g., the "3" key) on the keypad T a predetermined number of times within a predetermined time period.

Alternatively, the telephone TD can be designed such that the personal secret access code is inputted by the user only after the manipulation of a predetermined sequence of commands (such as, for example, the simultaneous pressing of keys "1" and "0" for a predetermined period of tine, such as, for example, 3 seconds). When the predetermined key sequence is entered, processing begins executing from step 21 in FIG. 3, wherein the user is requested to input a desired personal secret access code to enter the private mode.

There is no need to hide the public mode from the users of the telephone TD. Accordingly, when the telephone TD is set to the private mode, a request to switch the telephone TD from the private mode to the public mode can appear in the menu shown on the display D.

A variation of the present invention provides only one list for all stored telephone numbers, but with the feature that, in the case of a normal use of the telephone TD, only non-protected telephone numbers can be viewed from the list. In order to view protected (private) telephone numbers, the user must supply (input) his personal secret access code. According to this variation, once the personal secret access code is entered (for example, at the time of turning ON the telephone TD and/or when the viewing of the list is requested), the telephone numbers stored in the list of the telephone TD will show all public and private incoming and/or outgoing telephone numbers.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for managing pieces of information and data relating to telephone numbers, organized in telephone number lists, the telephone number lists being stored in a mobile phone, the method comprising:

a) automatically storing, under control of a microprocessor, telephone numbers of incoming and outgoing telephone calls in a first-telephone number list or in second telephone number list, such that the first telephone number list is accessible, under the control of the microprocessor, by any user during operation of the mobile phone, wherein the automatic storing includes storing in a temporary register the telephone number input by the user or the telephone number corresponding to the incoming call; and verifying whether the telephone number in the temporary register is included in the second telephone number list, which is code-protected, the second telephone number list of code-protected telephone numbers being previously defined by the user, such that, in an affirmative case, the code-protected telephone number is stored in the second telephone number list, accessible by a personal secret access code and, in a negative case, the not code-protected telephone number is stored in the first telephone number list of the outgoing or incoming calls;
    b) limiting the user's access to only the telephone numbers in the first telephone number list until the user of the mobile phone inputs the personal secret access code, and then the user has access to the telephone numbers in the first telephone number list and to telephone numbers in the second telephone number list;
    c) wherein the telephone numbers of the first and the second telephone number list are stored in the mobile phone and the telephone numbers stored in the second telephone number list are not stored in the first telephone number list; and
    d) inputting the personal secret access code, whereby the second telephone number list is accessible by the mobile phone user and displayed.

2. The method according to claim 1, further comprising at least one of refusing incoming calls from telephone numbers contained in the second telephone list and preventing the mobile phone from emitting an audible and/or visual indication of an incoming calls from telephone numbers contained in the second telephone list when the mobile phone is operated in a public mode, in which the personal secret access code has not yet been input.

3. The method according to claim 1, wherein the mobile phone is operable in two operating modes, in which a public mode is accessible, without access restrictions, to all users, and a private mode accessible, with access restrictions, to predetermined users, and wherein, when the mobile phone is in the public mode, the method further includes at least one of rejecting an incoming call and blocking of any visual and/or sound signals from a call originating from one of the code protected telephone numbers.

4. The method according to claim 2, further comprising switching from the public mode to the private mode via a keyboard command.

5. The method according to claim 3, wherein the keyboard command comprises at least one of a predefined sequence of commands and/or a predefined plurality of contemporary commands having a predetermined duration.

6. The method according to claim 3, wherein, after the input of the keyboard command, the switching to the private mode is completed after the input of the personal secret access code.

* * * * *

UNITED STATES PATENT AND TRADEMARK OFFICE
CERTIFICATE OF CORRECTION

| | | |
|---|---|---|
| PATENT NO. | : 8,280,021 B2 | Page 1 of 1 |
| APPLICATION NO. | : 12/187935 | |
| DATED | : October 2, 2012 | |
| INVENTOR(S) | : Sanchez | |

It is certified that error appears in the above-identified patent and that said Letters Patent is hereby corrected as shown below:

In the drawings

In Figure 4, Drawing Sheet 4 of 5, please change "INTIALIZE" to -- INITIALIZE --.

In Figure 4, Drawing Sheet 4 of 5, please change "IDENITFYING" to -- IDENTIFYING --.

In the specification

In column 1, line 8, please change "application is Continuation" to -- application is a Continuation --.

In column 10, line 44, please change "01-71-919276" to -- 01-71-9193276 --.

In column 10, lines 60-64 please replace the table with the following table so that the listing for "01-71-9193279" is moved from the Private List to the Public List:

| Public List | Private List |
|---|---|
| 01-71-2531927 | 01-54-4992267 |
| 2-01-2191441 | 01-71-9193276 |
| 00-17-07-4453475 | |
| 01-71-9193279 | |

In column 11, line 25, please change "period of tine," to -- period of time, --.

Signed and Sealed this
Eleventh Day of February, 2014

Michelle K. Lee
*Deputy Director of the United States Patent and Trademark Office*